United States Patent [19]

Schwenk

[11] Patent Number: 5,787,178

[45] Date of Patent: Jul. 28, 1998

[54] COMPUTERIZED METHOD FOR SIGNING A MESSAGE

[75] Inventor: Joerg Schwenk, Dieburg, Germany

[73] Assignee: Deutsche Telekom AG, Bonn, Germany

[21] Appl. No.: 631,278

[22] Filed: Apr. 12, 1996

[30] Foreign Application Priority Data

Apr. 12, 1995 [DE] Germany .................. 195 13 896.1

[51] Int. Cl.[6] .............................. H04K 1/00; H04L 9/00
[52] U.S. Cl. ............................. 380/30; 380/28; 380/25; 380/23
[58] Field of Search ................... 380/30, 23, 25, 380/28

[56] References Cited

U.S. PATENT DOCUMENTS

| | | | |
|---|---|---|---|
| 4,625,076 | 11/1986 | Okamoto et al. | 178/22.11 |
| 5,220,606 | 6/1993 | Greenberg | 380/43 |
| 5,231,668 | 7/1993 | Kravitz | 380/28 |
| 5,263,085 | 11/1993 | Shamir | 380/30 |
| 5,373,561 | 12/1994 | Haber et al. | 380/49 |
| 5,442,707 | 8/1995 | Miyaji et al. | 380/30 |

FOREIGN PATENT DOCUMENTS 0157258   9/1985   European Pat. Off. .

OTHER PUBLICATIONS

Offical Gazette, vol. 1184, Mar. 26,1996, p. 100.
Rivest, R. et al., "A Method for Obtaining Digital Signatures and Public–Key Cryptosystems", Communications of the ACM, vol. 21, No. 2 (Feb. 1978), pp. 120–126.
Diffie, W. et al., "New Directions in Cryptography", IEEE Transactions on Information Theory, vol. IT–22, No. 6, Nov. 1976, pp. 644–654.
Ben–Or, "Probabilistic Algorithms in Finite Fields", CH–1695–6/81/0000/0394$00.75 1981 IEEE, pp. 394–398.
Brecht, B., "The Future Has Already Started or Public Key Cryptography", pp. 97–106.
Michael Ben–Or, "Probabilistic Algorithms in Finite Fields", 22nd Annual Symposium on Foundations of Computer Science, pp. 394–398, Oct. 28–30, 1981.
Michale O. Rabin, "Digitalized Signatures and Public–Key Functions as Intractable as Factorization", MIT/LCS/TR–212, Jan. 1979.

Primary Examiner—Thomas H. Tarcza
Assistant Examiner—Carmen D. White
Attorney, Agent, or Firm—Kenyon & Kenyon

[57] ABSTRACT

A computerized method for signing a message, where a secret key is used for signing and the signature can be tested with the help of a public key, provides for the public key to be a number n that is the product of two large prime numbers p and q; the secret key includes at least one of the two prime numbers; a polynomial is created in the form $P(x)=x^k+a_{k-1}x^{k-1}+\ldots+a_1x+a_0$, whose coefficients $a_{k-1} \ldots a_0$ are formed from the message, taking into account a random number. This polynomial is used to derive additional polynomials $P(x) \bmod p$ and $P(x) \bmod q$ whose zeros in the respective finite fields $GF(p)$ and $GF(q)$ are defined. The zeros are combined into one or more solutions z of the equation $P(x) \bmod n=0$, and the random number and the solution z or selected solutions z are added as the signature to the message.

20 Claims, 1 Drawing Sheet

COMPUTERIZED METHOD FOR SIGNING A MESSAGE

FIELD OF THE INVENTION

The present invention concerns a process for electronically signing a digitized message, wherein a secret key is used for signing and the signature can be tested with a public key.

BACKGROUND OF THE INVENTION

The general principle of a signature method is described, for example, in *IEEE Transactions on Information Theory*, vol. IT-22, November 1976, pages 644 to 654. A concrete embodiment of this principle—also known as the RSA method—was described for the first time in *Communications of the ACM*, vol. 27, no. 27, February 1978, pages 120 to 126. Using the secret key, a signature is generated for the data set transmitted, whereupon each individual receiver can then use the public key to test the authenticity and origin of this signature.

The known RSA method is based on the mathematical problem of factoring such numbers, in other words, determining the factors of the numbers.

SUMMARY OF THE INVENTION

The object of this invention is to enable practical implementation of the signature and its verification in the simplest possible manner and at a high speed.

This object is achieved according to this invention by providing a public key as a number n that is the product of two large prime numbers p and q, providing a secret key including at least one of the two prime numbers, forming a polynomial of the form $P(x)=x^k+a_{k-1}x^{k-1}+ \ldots +a_1x+a_0$ whose coefficients $a_{k-1} \ldots a_0$ are formed from the message by taking into account a random number, this polynomial is used to derive additional polynomials $P(x)$ mod p and $P(x)$ mod q whose zeros in the respective finite fields GF(p) and GF(q) are determined, combining the zeros to form one or more solutions z of the equation $P(x)$ mod n=0 and adding the random number and the solution z or selected solutions z to the message as the signature.

In the event no zeros can be found in the respective finite field for one or both of the additional polynomials, a refinement provides for the steps of creating the polynomial, deriving the additional polynomials and determining the zeros of the additional polynomials to be repeated with another random number if necessary until both of the zeros thus determined are in the respective finite field.

A very high degree of security is achieved especially when each of the two additional polynomials has at least two different zeros in the respective finite field. For this reason another refinement of the method according to this invention provides for the creation of the polynomial, the derivation of the additional polynomials and the determination of the zeros of the additional polynomials to be repeated if necessary with another random number until both additional polynomials have at least a given number of zeros in the respective finite field.

If the zeros of $P(x)$ mod p are $d_1$ and $d_2$ and those of $P(x)$ mod q are $e_1$ and $e_2$, the signature of the message will include the random number plus the two numbers $\alpha \cdot p \cdot e_1 + \beta \cdot q \cdot d_1$ and $\alpha \cdot p \cdot e_2 + \beta \cdot q \cdot d_2$, where $\alpha \cdot p + \beta \cdot q = 1$ is a multiple sum representation of the number 1 that can be calculated with the help of an extended Euclidean algorithm.

A method of forming coefficients that is especially advantageous when the calculations are repeated with different random numbers is achieved with another refinement of this invention where the coefficient $a_0$ is formed by the random number and the other coefficients of the polynomial are derived from the message using certain steps. The other coefficients can be formed, for example, by the fact that the certain steps include dividing the message into blocks and assigning the blocks to the individual coefficients.

An advantageous embodiment of the process according to this invention includes calculating the solution z from the zeros of the additional polynomials by using the extended Euclidean algorithm and the Chinese Remainder theorem.

This method is secure when $k \geq 2$. The number n should be as large as possible for security reasons. A compromise between security and extensive computation that is favorable with regard to the current requirements is obtained with $\log_2 n \approx 500$.

A quick and simple test of the signature created with the method according to this invention is possible by determining whether the number $P(z)$ mod n is equal to zero. With several zeros per each additional polynomial, the signature can be tested by determining whether each of the numbers $P(z)$ mod n is equal to zero.

An advantageous terminal for a telecommunications network includes providing a program containing the steps necessary for the process according to this invention which are executed by a computer.

In one embodiment of the terminal according to this invention, operation in receiving a signed message is facilitated by the fact that a list of the public keys belonging to the given senders of messages can be stored.

Another embodiment of the terminal according to this invention makes it easy to sign a message that is to be sent by providing one or more secret keys that can be stored and retrieved by entering a password and then used for a message to be sent.

The method according to this invention may be applied in a variety of ways, for example, to legal and contract texts or any messages in business and official communications that result in legal liability and therefore must also be signed by hand in conventional written communications. Such text documents can be interpreted as a binary number with the value m. The integer n to be used as the public key is the product of two large prime numbers p and q. At least one of these is known, but only to the sender.

DETAILED DESCRIPTION

Figure 1:
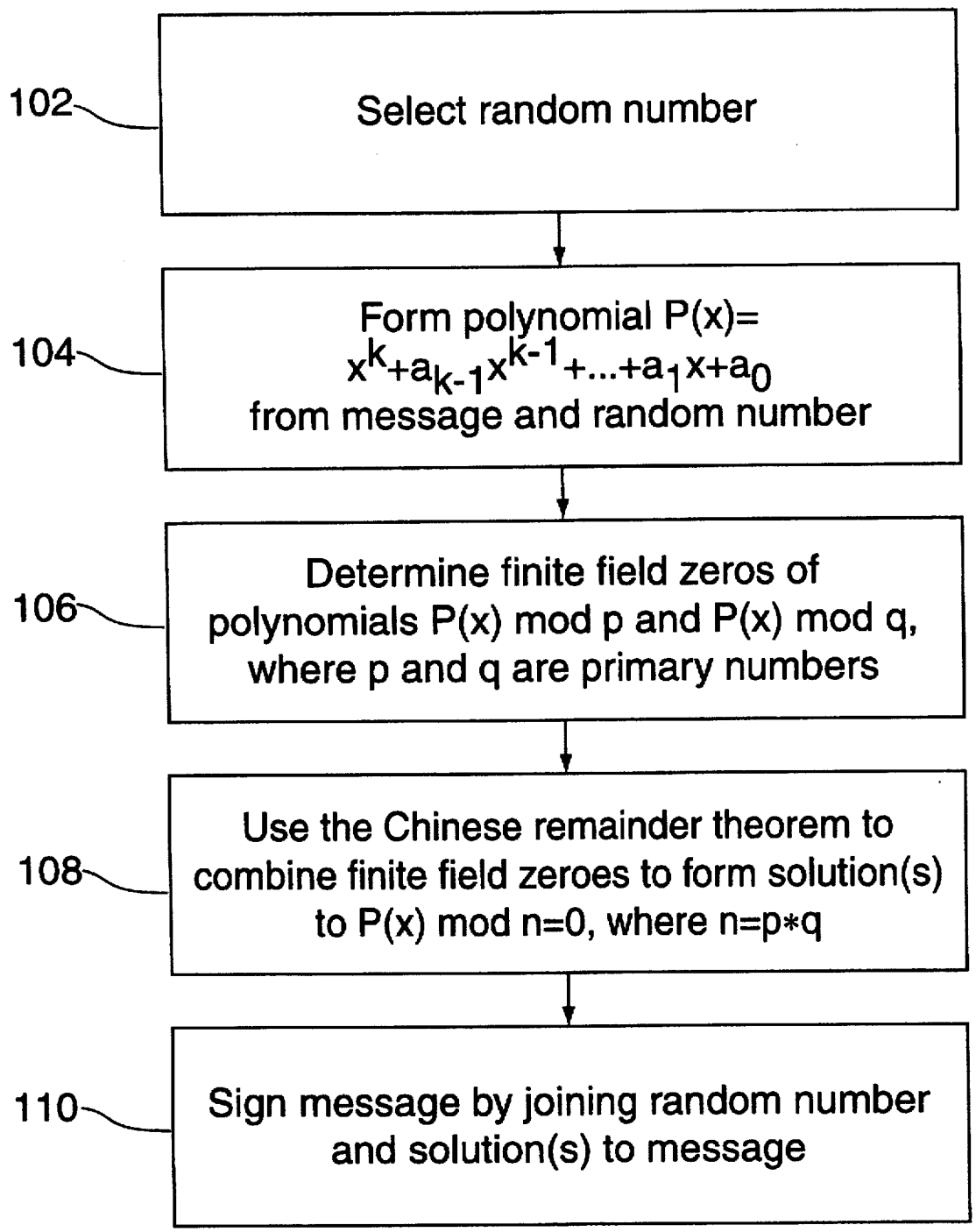
FIG. 1 shows a flowchart of the method of the present invention.

In a preferred embodiment of this invention, in order to sign a message m, it is broken down into blocks $a_{k-1}, \ldots, a_1$ to the extent that the blocks are interpreted as numbers smaller than n. As shown in FIG. 1, a random number $a_0$ is selected at step 102 for signing the message m, and the polynomial $P(x)=x^k+a_{k-1}x^{k-1}+ \ldots +a_1x+a_0$ is formed at step 104 and from it are derived the polynomials $P(x)$ mod p and $P(x)$ mod q which are tested for the zeros in the finite fields GF(p) and GF(q) at step 106. For example, this can be accomplished with the help of the probabilistic algorithm described by Ben-Or: "Probabilistic algorithms in finite fields," Proc. IEEE FOCS 1981, pages 394–398. With a probability of more than ½ at least one solution is obtained that can be combined, with a probability of more than ¼, using the Chinese Remainder theorem, to find at least one solution z of the equation P(x) mod n=0, as shown at step 108. The signature of the message m then includes the random number $a_0$ and the number z with the property P(z) mod n=0, as shown at step 110.

To test the signature, the polynomial P(x) is formed in the same way as in signing, although the number $a_0$ is derived from the signature. Then the signature is tested with the number z from the signature to determine whether the equation P(z) mod n=0 is satisfied. The security of the process according to this invention is comparable to that of the RSA method. If each of the two additional polynomials has at least two different zeros, the process can be modified so that its security is equivalent to the difficulty of factoring the number n. A person seeking to forge the signature must find a solution to the equation P(x) mod n=0, or could also factor the number n with a probabilistic method.

The method according to this invention is described below on the basis of a numerical example, where the numbers selected are small for the sake of simplicity. It is assumed that the two prime numbers are p=1237 and q=5683, so the public key is n=7029871.

To sign the message m=12345673891012, the message is divided into two blocks $a_2$=1234567 and $a_1$=3891012. Choosing a random number in FIG. 1, yields $a_0$=2473865, so the following polynomial can be formed block 104:

$$P(x)=x^3+1234567x^2+3891012x+2473865,$$

from which the following two polynomials can be derived:

$$P(x) \bmod p=x^3+41x^2+647x+1102$$

and $$P(x) \bmod q=x^3+1356x^2+3840x+1760$$

Each of these polynomials has exactly one solution:

$$z_p=1057 \text{ in GF(p) and } z_q=1121 \text{ in GF(q)}.$$

With the extended Euclidean algorithm, this yields:

$$-2683 \cdot p + 584 \cdot q = 1.$$

With the help of this representation, a zero z of the equation P(x) mod n=0 can be constructed by calculating the number $-2683 \cdot p \cdot z_q + 584 \cdot q \cdot z_p$ mod n=5519314 with the help of the Chinese Remainder theorem. The signed message is then:

(12345673891012, 2473865, 5519314).

The verification of the signature by a receiver is performed after reconstructing the polynomial P(x) with the help of the first two components of the signed message. For x=5519314 and n=7029871, this polynomial is then calculated as follows and compared with 0:

$$P(5519314) \bmod n=(5056074+4128968+2400835+2473865) \bmod n=0.$$

The above described signature method may be performed by a sending microprocessor of a terminal and the verification by a receiving microprocessor of a terminal. In addition, the Chinese remainder theorem calculations could, be performed not only by the sending microprocessor itself, but also by a special apparatus associated with the sending microprocessor, for example that described in U.S. Pat. No. 4,709,345, which is hereby expressly incorporated by reference herein. Commonly-assigned U.S. Patent application Ser. No. 08/630,701, filed on Apr. 12, 1996, is hereby expressly incorporated by reference herein.

What is claimed is:

1. A method generating a digital signature and using the Signature to sign an electronic message, wherein a microprocessor uses a secret key for signing and the signature can be tested by an other microprocessor with the help of a public key, the public key being a number n that is the product of two prime numbers p and q, and the secret key including at least one of the two prime numbers p and q, the method comprising the steps of:

forming a polynomial of the form $P(x)=x^k+a_{k-1}x^{k-1}+\ldots+a_1x+a_0$, where the coefficients $a_{k-1} \ldots a_0$ are formed from the message by taking into account a random number, deriving additional polynomials P(x) mod p and P(x) mod q;

determining, zeros in respective finite fields GF(p) and GF(q) of the additional polynomials P(x) mod p and P(x) mod q;

finding at least one solution z of the equation P(x) mod n=0 by using the zeros; and joining the random number and the at least one solution z to the message.

2. The method as recited in claim 1 wherein the steps of forming the polynomial, deriving the additional polynomials and determining the zeros of the additional polynomials are repeated if necessary with another random number until each additional polynomial has at least one zero in its respective finite field.

3. The method as recited in claim 1 wherein the steps of creating the polynomial, deriving the additional polynomials and determining the zeros of the additional polynomials are repeated if necessary with another random number until both additional polynomials have at least a predetermined number of zeros in the respective finite field.

4. The method as recited in claim 1 wherein the solution z is calculated from the zeros of the additional polynomials by using an extended Euclidean algorithm and the Chinese Remainder theorem.

5. The method as recited in claim 1 wherein k>2.

6. The method as recited in claim 1 wherein $\log_2 n \approx 500$.

7. The method as recited in claim 1 further comprising the step of verifying the signed message by determining whether the at least one solution z satisfies the equation P(z) mod n=0.

8. The method as recited in claim 1 further comprising the step of storing a list of public keys in the other microprocessor.

9. The method as recited in claim 1 further comprising the steps of storing at least one secret key in the microprocessor and accessing the secret key by entering a password.

10. A method for generating a digital signature and using the signature to sign an electronic message, wherein a microprocessor uses a secret key for signing and the signature can be tested by an other microprocessor with the help of a public key, the public key being a number n that is the product of two prime numbers p and q, and the secret key including at least one of the two prime numbers p and q, the method comprising the steps of:

forming a polynomial of the forming $P(x)=x^k+a_{k-1}x^{k-1}+\ldots+a_1x+a_0$, where the coefficients $a_{k-1}\ldots a_0$ are formed from the message and the coefficient $a_0$ is a random number, deriving additional polynomials $P(x)$ mod $p$ and $P(x)$ mod $q$;

determining zeros in respective finite fields $GF(p)$ and $GF(q)$ of the polynomials $P(x)$ mod $p$ and $P(x)$ mod $q$;

finding at least one solution $z$ of the equation $P(x)$ mod $n=0$ by using the zeros; and joining the random number and the at least one solution $z$ to the message.

11. The method as recited in claim 10 wherein the message is divided into blocks forming the individual coefficients $a_{k-1}\ldots a_1$.

12. The method as recited in claim 10 wherein the steps of forming the polynomial, deriving the additional polynomials and determining the zeros of the additional polynomials are repeated if necessary with another random number until each additional polynomial has at least one zero in its respective finite field.

13. The method as recited in claim 10 wherein the steps of creating the polynomial, deriving the additional polynomials and determining the zeros of the additional polynomials are repeated if necessary with another random number until both additional polynomials have at least a predetermined number of zeros in the respective finite field.

14. The method as recited in claim 10 wherein the solution $z$ is calculated from the zeros of the additional polynomials by using an extended Euclidean algorithm and the Chinese Remainder theorem.

15. The method as recited in claim 10 wherein $k \geq 2$.

16. The method as recited in claim 10 wherein $\log_2 n \approx 500$.

17. The method as recited in claim 10 further comprising the step of verify in the signed message by determining whether the at least one solution $z$ satisfies the equation $P(z)$ mod $n=0$.

18. The method as recited in claim 10 further comprising the step of storing a list of public keys in the other microprocessor.

19. The method as recited in claim 10 further comprising the steps of storing at least one secret key in the microprocessor and accessing the secret key by entering a password.

20. The method as recited in claim 1 further comprising the step of transmitting the message and at least one solution $z$ from the microprocessor to the other microprocessor.

\* \* \* \* \*

UNITED STATES PATENT AND TRADEMARK OFFICE
CERTIFICATE OF CORRECTION

PATENT No. : 5,787,178

DATED : July 28, 1998

INVENTOR(S): SCHWENK

It is certified that error appears in the above-identified patent and that said Letters Patent is hereby corrected as shown below:

In claim 1 - line 24
"determining  zeros"
to --determining zeros--.
(no comma)

Signed and Sealed this

Twenty-third Day of February, 1999

Attest:

Q. TODD DICKINSON

*Attesting Officer*     *Acting Commissioner of Patents and Trademarks*